United States Patent Office 2,788,371
Patented Apr. 9, 1957

---

2,788,371

TETRA-ALKYL-SUBSTITUTED DIAMINE COMPOUNDS

John V. Scudi, Springfield, N. J., and Leon E. Tenenbaum, Ardsley, and Godfrey F. Grail, New York, N. Y., assignors to Nepera Chemical Co., Inc., Yonkers, N. Y., a corporation of New York No Drawing. Application April 7, 1955,
Serial No. 500,022

3 Claims. (Cl. 260—583)

This invention relates to novel diamine compounds and relates more particularly to certain novel tetra-alkyl-substituted diamine compounds which have been found to be antiviral agents active against influenza A virus.

An object of this invention is the provision of novel organic chemical compounds which are useful as antiviral agents against the influenza A virus.

Other objects of this invention will appear from the following detailed description.

Influenza is an acute, infectious disease caused by a virus of the influenza group. Vaccination with a suitable serum as well as recovery from this disease confers some immunity against further attack, but such immunity does not appear to be permanent. Influenza has been produced experimentally in animals including the ferret, in mice, guinea pigs, white rats, etc. Developing chick embryos can be easily infected. The presence of the influenza virus may be readily detected by reason of the capacity of the virus to cause the agglutination of red blood cells. The hemagglutination which is observed is the result of the interaction between the virus particles and the erythrocytes, and, while erythrocytes from a great many mammals are agglutinated, chicken red cells are the most satisfactory for test purposes. However, when influenza virus and immune serum are mixed, hemagglutination is inhibited and does not occur. The hemagglutination inhibition test gives both a qualitative and quantitative indication of the presence of antibodies. The action of antiviral agents with respect to their inhibition of hemagglutination is similar to the action of the antibodies present in immune serum and the capacity of such agents to inhibit hemagglutination of erythrocytes is a measure of their antiviral activity.

We have now found that the tetra-alkyl-substituted ethylene diamine compounds N-hexyl-N-propyl-N',N'-dimethyl-ethylene diamine, N-hexyl-N-isopropyl-N',N'-dimethyl-ethylene diamine and N-dodecyl-N-methyl-N',N'-dimethyl-ethylene diamine exhibit marked antiviral activity against the influenza A virus (PR 8 strain). This particular antiviral activity is singular to the extent that it is not observed in compounds of closely related structure which either have no antiviral activity at all or, when active, exhibit this activity against wholly different viruses.

The compounds of our invention may be obtained by reacting a β-dimethylamino-ethyl halide, such as the chloride or bromide, with a molecular excess of the desired secondary amine, for example, hexyl propyl amine, hexyl isopropyl amine or dodecyl methyl amine in an inert solvent, such as xylene. For example, β-dimethyl-amino-ethyl chloride and an excess of the amine are added to xylene and the reaction mixture obtained heated under pressure as in an autoclave, at a temperature of about 140 to 185° C. usually for 12 to 48 or even 60 hours. After cooling, the excess of unreacted amine may be readily removed from the cooled mixture as the hydrochloride salt, since the excess of dialkylamine acts as an acid binding agent for the hydrogen chloride formed as a byproduct. The hydrochloride salt of the dialkylamine is insoluble in the xylene solvent. The reaction product is separated from the xylene or other solvent by subjecting the solvent solution to extraction with dilute aqueous hydrochloric acid so as to cause the water-soluble hydrochloride of the amine base to go into the aqueous phase. The free base may be separated from the aqueous phase by adding aqueous sodium hydroxide to the aqueous amine hydrochloride solution until the hydrochloride is neutralized and the amine base set free. The neutralized aqueous solution may then be extracted with ether and, after drying the ether extract, the ether is evaporated leaving the alkyl-substituted dimethyl ethylene diamine. The latter may be further purified by fractionation under reduced pressure.

In order further to illustrate our invention but without being limited thereto, the following examples are given:

Example I 69.0 parts by weight of hexyl propyl amine and 25.9 parts by weight of β-dimethylamino-ethyl chloride are dissolved in 116 parts by weight of xylene and the mixture formed then heated in a sealed vessel for about 60 hours at a temperature of 145 to 150° C. and the insoluble precipitate of the hydrochloride of hexyl propyl amine is filtered off. The solid material is washed with xylene and the wash solvent combined with the filtrate. The combined xylene solution is extracted with dilute 10% aqueous solution of hydrochloric acid. The hydrochloride of the N-hexyl-N-propyl-N',N'-dimethyl-ethylene diamine formed goes into solution in the aqueous phase. A 40% by weight aqueous solution of sodium hydroxide is added to the aqueous hydrochloride solution until the pH reaches 10.8. The amine base which is freed on addition of the alkali is separated from the aqueous phase by extraction with ether. The ether solution is dried over solid potassium hydroxide, then decanted and the ether evaporated leaving N-hexyl-N-propyl-N',N'-dimethyl-ethylene diamine as a residue. The latter may be further purified by fractional distillation. This novel compound boils at a temperature of 126 to 134° C. at a pressure of 22 mm. of mercury. This compound is a pale yellow liquid, soluble in organic solvents, such as ether, alcohol and toluene and is insoluble in water.

Example II 71.5 parts by weight of hexyl isopropyl amine and 26.88 parts by weight of β-dimethylamino-ethyl chloride are dissolved in 139.2 parts by weight of xylene and the mixture thus formed then heated in a sealed vessel for about 24 hours at a temperature of about 160 to 165° C. An insoluble precipitate of hexyl isopropyl amine hydrochloride is formed and is filtered off and washed with xylene. The xylene wash liquor is combined with the xylene filtrate. The N - hexyl - N - isopropyl - N',N'-dimethyl-ethylene diamine present in solution is separated from the organic solvent by extracting the combined xylene solutions with a dilute 10% aqueous solution of hydrochloric acid. Aqueous 40% by weight sodium hydroxide is then added to the aqueous hydrochloric acid extract until a pH of 9.0 is reached. The neutralization of the hydrochloride salt releases the free base and the latter may then be separated from the aqueous phase by an ether extraction. The ether extract obtained is dried over solid potassium hydroxide, the ether solution decanted from the potassium hydroxide and the volatile ether solvent then evaporated off. The N-hexyl-N-isopropyl-N',N'-dimethyl-ethylene diamine thus obtained is found to boil at 140 to 149° C. at a pressure of 33 mm. of mercury. The compound is a pale yellow oil, soluble in organic solvents such as alcohol, ether and toluene, but insoluble in water.

*Example III*

29.5 parts by weight of dodecyl methyl amine and 7.8 parts by weight of β-dimethylamino-ethyl chloride are dissolved in 116 parts by weight of xylene and the mixture thus formed then heated in a sealed vessel for about 48 hours at a temperature of about 160 to 165° C. Aqueous 40% by weight sodium hydroxide is then added until the reaction mixture is alkaline. The aqueous phase is separated from the xylene phase and the aqueous phase extracted with ether. The ether extract is added to the xylene phase and the mixture distilled to remove the ether, xylene and unreacted dodecyl methyl amine. The N - dodecyl - N - methyl - N',N' - dimethyl - ethylene diamine is then recovered from the residue by a further distillation under reduced pressure. The N-dodecyl-N-methyl-N',N'-dimethyl-ethylene diamine obtained is found to boil at 135 to 142° C. at a pressure of 2 mm. of mercury. The compound is a pale white, almost colorless liquid which is soluble in organic solvents such as ether, alcohol, toluene, etc. but insoluble in water.

The novel alkyl-substituted diamines of our invention also form water-soluble sulfate salts in addition to water-soluble hydrochlorides. In addition, these compounds form other useful non-toxic, water-soluble acid salts including the phosphate, tartrate, maleate, lactate, acetate and citrate. When the water-soluble salts are dissolved in water, the solution obtained may be mixed with poultry feed or the aqueous solution added in controlled amounts to the water supply provided for the poultry flocks. These compounds may also be put up in the form of pills, tablets, capsules, etc. with or without other therapeutic agents in combination therewith, employing the usual pharmaceutical carriers and adjuvants such as talc, lactose, dextrose, magnesium stearate, etc.

This application is a continuation-in-part of our copending applications S. No. 298,434, 298,435 and 298,443, all filed on July 11, 1952, now abandoned.

It is to be understood that the foregoing detailed description is given merely by way of illustration and that many variations may be made therein without departing from the spirit of our invention.

Having described our invention, what we desire to secure by Letters Patent is:

1. Compounds of the groups consisting of N-hexyl-N-propyl-N',N'-dimethyl-ethylene diamine and N-hexyl-N-isopropyl-N',N'-dimethyl-ethylene diamine and their non-toxic, water-soluble acid salts.

2. The compound N-hexyl-N-propyl-N',N'-dimethyl-ethylene diamine.

3. The compound N-hexyl-N-isopropyl-N',N'-dimethyl-ethylene diamine.

References Cited in the file of this patent

UNITED STATES PATENTS 2,627,491  Szabo et al. _____ Feb. 3, 1953

FOREIGN PATENTS 85,873  Sweden _____ Mar. 24, 1936
56,442  Norway _____ Apr. 20, 1936

OTHER REFERENCES

Meyer: "Chem. Abst." (1922), vol. 16, page 1220.
Speyer et al.: "Chem. Abst." (1922), vol. 16, page 1777.
Gilman: "Chem. Abst." (1925) vol. 19, page 653.
Linsker et al.: "Chem. Abst." (1945), vol. 39, page 5248.
Linsker et al.: "Chem. Abst." (1946), vol. 40, page 6416.
Lilly et al.: "Chem. Abst." (1948), vol. 42, page 5055.
Frost: "Chem. Abst." (1950), vol. 44, page 1022.
Duca et al.: "Proc. Soc. Exptl. Biol. Med." (1951), vol. 78, pp. 99–100.
Reinhard et al.: "Jour. Pharm. Exptl. Therap." (Sept. 1951), vol. 103, No. 1, pages 288–92.